United States Patent Office 3,069,325
Patented Dec. 18, 1962

3,069,325
TREATMENT OF HYDROCARBONS
Donald O. Hitzman, Bartlesville, Okla., assignor to Phillips Petroleum Company, a corporation of Delaware
No Drawing. Filed Dec. 21, 1959, Ser. No. 860,703
14 Claims. (Cl. 195—3)

This invention relates to the treatment of hydrocarbons. In one aspect, this invention relates to the removal of organic contaminants from hydrocarbons by subjecting said hydrocarbons to the action of microorganisms. In another aspect, this invention relates to the stabilization of hydrocarbons by removing organic contaminants therefrom through the action of microorganisms.

Modern jet engines are becoming very exacting in their fuel requirements. Many different specifications have been developed to cover the different types of fuels required by different types of jet engines. However, regardless of the type of fuel or the type of engine in which said fuel is to be used, all fuels have one requirement in common, i.e., said fuels must undergo minimum changes during storage subsequent to manufacture and prior to use.

Naturally occurring organic contaminants found in many hydrocarbon mixtures present a source of change. For example, many crude oils produced from wells in the Mid-Continent and West Coast areas contain nitrogen and/or oxygen containing compounds which are present as complex organic compounds. Said nitrogen and/or oxygen containing compounds have a deleterious effect upon fuels which are prepared from these types of crude oils. For example, the potential gum content and instability which are inherent in fuels which contain nitrogen and/or oxgen containing compounds present problems in the preparation and subsequent use of said fuels. Sulfur containing compounds are also present in many types of crude oils produced in the Mid-Continent and West Coast areas. Said sulfur containing compounds in reasonable amounts (up to about 0.5 weight percent) are not objectionable per se. However, when such fuels are stored over sea water, as is common in various military installations, said sulfur compounds represent a potential corrosiveness because microorganisms attack said sulfur compounds leaving residues in the fuel which are corrosive.

It is known that microorganisms contribute to the formation of sludge in jet engine fuels, which sludge hampers flight operation. Said sludge accumulates in tanks used to store said fuels and is a common occurrence in tanks aboard ships and on land. Said sludge occurs to a greater or lesser extent in every case where the fuel is stored in contact with an aqueous phase. The problem is presented in its most serious aspects when said fuels are stored over sea water. Said sludge forms mainly at the hydrocarbon-water interface and is then dispersed into the hydrocarbon by agitation. So far as is presently known the sludge becomes harmful only when mixed into the hydrocarbon, as by agitation during pumping operations, etc.

A mixture of hydrocarbons as complex as those found in a kerosene type jet fuel, for example, provides a remarkable growth medium for microorganisms. As soon as an aqueous phase is added, microbial action will occur at the interface and will continue until some limiting nutrient or environmental condition has been exhausted or changed. At the beginning several types of microorganisms will be present but competitive conditions will normally select only those most able to adapt themselves and thrive under the specific conditions present at a particular time. This results in a continual interaction between types of microorganisms and environment and a fluctuation of types and numbers of microorganisms. This dynamic condition is definitely influenced by the carbon sources available to the microorganisms since all microorganisms must have carbon and nitrogen in some form, and most microorganisms require trace amounts of other elements such as phosphorus, sulfur, magnesium, etc., in order to prepare the cell material of which their bodies are composed. This requirement of the microorganisms for certain elements causes certain compounds containing said elements to be preferentially attacked when a mixture of compounds is exposed to the action of microorganisms.

As mentioned above, the formation of sludge during storage is most serious when the fuels are stored over sea water. Since in modern practices jet fuels are commonly stored over sea water, particularly in military installations, it is highly desirable that said sludge formation be reduced or eliminated.

I have found that when a mixture of hydrocarbons is subjected to the action of a specific strain or strains of microorganisms propagated from sea water, organic contaminants will be removed, said hydrocarbons will be stabilized, and changes which would normally occur during storage of the hydrocarbons over sea water are largely eliminated. Thus, broadly speaking, the present invention resides in subjecting hydrocarbons to the action of a specific strain or strains of microorganisms propagated from sea water to remove organic contaminants therefrom.

An object of this invention is to utilize a facultative population of microorganisms to remove organic contaminants, present as organic nitrogen containing compounds, from hydrocarbons. Another object of this invention is to utilize a facultative population of microorganisms to remove organic contaminants, present as organic oxygen containing compounds, from hydrocarbons. Another object of this invention is to utilize a facultative population of microorganisms to remove organic contaminants, present as organic sulfur containing compounds, from hydrocarbons. Another object of this invention is to provide mixtures of hydrocarbons, such as jet fuels, of reduced potential gum content. Another object of this invention is to stabilize mixtures of hydrocarbons, such as jet fuels, against changes which would normally occur when said hydrocarbons are stored over water, particularly sea water. Other aspects, objects, and advantages of the invention will be apparent to those skilled in the art in view of this disclosure.

Thus, according to the invention, there is provided a method of treating liquid petroleum hydrocarbon for the removal of organic contaminants therefrom, which method comprises: propagating, from a sea water culture medium containing an added nutrient, colonies of microorganisms capable of consuming and requiring said contaminants for assimilation in their metabolic processes; inoculating another sea water culture medium with said microorganisms; and contacting said hydrocarbon with said inoculated culture medium in the absence of any added nutrient.

It is to be noted that a specific strain or strains of microorganisms capable of consuming and requiring the organic contaminants for assimilation in their metabolic processes are propagated from a sea water culture medium containing an added nutrient. The thus grown microorganisms are used to inoculate another sea water culture medium containing no added nutrient. When said inoculated sea water culture medium is used to contact the hydrocarbons, the microorganisms must turn to the hydrocarbons for nutrients and the contaminants therein are attacked and consumed. Since said contaminants are used in the metabolic processes of the microorganisms, said contaminants end up in the cell materials of which the bodies of said microorganisms are formed. Thus, said contaminants are completely removed from the hydrocarbons because they are assimilated into the bodies of the microorganisms and when said microorganisms die their bodies enter into the sludge which is formed at the interface between the fuel and water. For example, no sulfate or hydrogen sulfide are formed which must be subsequently removed from the hydrocarbons. The method of the invention thus differs from the processes of the prior art wherein the form of the contaminants is merely changed, remains in the hydrocarbon, and must be subsequently removed therefrom.

It is also to be noted that the invention is not limited to any particular species of microorganisms. The only requirement is that the microorganisms be capable of consuming and require the contaminants for assimilation in their metabolic process. Thus, any facultative microorganisms can be used. Both aerobic and anaerobic microorganisms are included. Examples of such microorganisms are Bacillus, Achromobacter, Pseudomonas, and Thiobacteria.

The following examples will serve to further illustrate the invention.

EXAMPLE I

A sea water culture or nutrient medium having the following composition is prepared.

Table I

| Ingredient: | Grams |
|---|---|
| $NH_4NO_3$ | 1.0 |
| $KH_2PO_4$ | 1.0 |
| $MgSO_4 \cdot 7H_2O$ | 0.5 |
| KCl | 0.05 |
| $FeSO_4 \cdot 7H_2O$ | 0.01 |
| Sea water | 1000.0 |

Fifty milliliters of a topped and desalted West Coast crude oil having a nitrogen content of 0.4 weight percent is mixed with about 300 milliliters of the above sea water culture medium in a vessel which provides a large interface between the two liquids. The mixture is allowed to stand under incubation conditions at a temperature of about 30° C. for 24 days. During said time a growth or sludge appears in the media at the interface between the oil and aqueous phases.

A series of solutions consisting of 0.05 weight percent of the following nitrogen containing compounds is kerosene is prepared. The nitrogen containing compounds utilized in forming said kerosene solutions are:

Table II

Aniline
p-Toluidine
m-Xylidine
Mesidine
Lutidine
2,5-dimethyl pyrrole
Beta-methyl indole
Indole carbazole
Pyrrolidine Cultures using said kerosene solutions are set up in the same manner as the original culture using the above described sea water culture medium except that said kerosene solutions are substituted for the West Coast crude oil. Samples of the growth or sludge in the crude oil-sea water culture are used to inoculate each of the kerosene solution-sea water culture mediums. Said inoculated kerosene solution-seat water culture media are then allowed to stand under incubating conditions at a temperature of about 30° C. for a period of 10 days. This process is repeated if necessary until a colony of microorganisms is established in each kerosene solution-sea water culture medium. Samples of each said colony are then used to inoculate additional kerosene solution-sea water culture media containing nutrient quantities of one of each of said nitrogen containing compounds until a stock colony of microorganisms adapted to and requiring one of each of said nitrogen containing compounds is established.

A mixture of equal volumes of the nitrogen containing compounds set forth in Table II above is then made up and used to prepare a 0.005 weight percent solution in kerosene. A culture medium consisting of this solution and sea water containing one gram per liter of ammonium nitrate is then prepared in the same manner as described and inoculated with samples of the microorganisms from each of the above described nine stock colonies. Said culture medium is then stored under incubating conditions at a temperature of about 30° C. for a period of 10 days to grow a strain of microorganisms adapted to and requiring any of said nine nitrogen containing compounds.

One gallon of a jet fuel whose composition and physical properties are given in Table III below is added to a 5 gallon bottle containing 2 gallons of sea water. This culture medium is then inoculated with a sample of the microorganisms propagated from the mixture of said nine nitrogen compounds. The inoculated culture medium is then stored under incubating conditions at a temperature of about 25° C. for a period of 7 days. During said incubation period agitation is provided at the hydrocarbon-water interface by introduction of air at a level about one inch below the interface. At the end of said incubation period the hydrocarbon phase is separated and dried to obtain samples for analysis. A portion of said hydrocarbon material is filtered before running gum tests. The results of tests on the jet fuel before and after treatment are given in Table III below.

Table III

| Physical properties of jet fuel | Before | After treatment | After filtration |
|---|---|---|---|
| Gravity, API | 47.5 | 47.2 | |
| ASTM Distillation, ° F.: | | | |
| IBP | 129 | 133 | |
| 10% | 221 | 242 | |
| 50% | 323 | 348 | |
| 90% | 408 | 410 | |
| FBP | 464 | 468 | |
| Reid vapor pressure, lb | 3.5 | 3.2 | |
| Freezing point, ° F | below −80 | below −80 | |
| Sulfur, wt. percent | 0.15 | 0.14 | |
| Nitrogen, wt. percent | 0.02 | 0.002 | |
| Bromine No., g./100 g | 16.1 | 16.0 | |
| Existent gum, mg./100 ml | 0.4 | 4.8 | 1.0 |
| Accelerated gum, mg./100 ml | 4.4 | 5.4 | 1.6 |
| Hydrocarbon Type analysis: | | | |
| Saturated, Vol. percent | 71 | 70 | |
| Olefins, Vol. percent | 9 | 9 | |
| Aromatics, Vol. percent | 20 | 21 | |

It will be noted that the existent gum after treatment is somewhat higher than before treatment. However, the greater part of this gum is filterable and this property is reduced on filtration to the value of 1 mg./100 ml. The accelerated gum, a measure of storage stability, is only 1.6 mg./100 ml. on the filtered sample, as compared to 4.4 mg./100 ml. on the original sample, showing that the jet fuel has been stabilized. It should also be noted that the nitrogen content has been reduced from 0.02 to 0.002 weight percent by the action of the microorganisms.

EXAMPLE II

A sea water culture or nutrient medium having the following composition is prepared.

Table IV

| Ingredient: | Grams |
|---|---|
| $(NH_4)_2SO_4$ | 0.5 |
| $KH_2PO_4$ | 1.0 |
| $MgSO_4 \cdot 7H_2O$ | 0.5 |
| KCl | 0.05 |
| $FeSO_4 \cdot 7H_2O$ | 0.01 |
| Sea water | 1000.0 |

The general procedure of Example I is used to grow a strain or strains of microorganisms adapted to and requiring organic sulfur containing compounds for assimilation in their metabolic processes. The only essential differences from the procedure of Example I are (1) the sea water culture or nutrient medium of the above Table IV is used, (2) a Western Kansas crude oil having a sulfur content 0.5 weight percent is used as the starting hydrocarbon constituent, (3) the organic sulfur containing compounds listed in Table V below are used instead of the nitrogen compounds listed in the above Table II, and (4) the sea water used in the culture to grow the final strain or strains of microorganisms which are then used to treat the jet fuel of Table VI below contained 1 gram per liter of ammonium sulfate instead of ammonium nitrate.

*Table V*

2,5-dimethylthiophene
Thionyl aniline
Thionyl-o-toluidine
Phenothiazine
1,2-benzisothiazine
Thianthrene
1,3-dithia-2,4-diazole
1,2,3,4-trithiazole
1,4-thiazine
p-Isothiazine
2-methyl-1,3-thiazine One gallon of a jet fuel whose composition and physical properties are given in Table VI below is added to a 5 gallon bottle containing 2 gallons of sea water. This culture medium is then inoculated with a sample of the microorganisms propagated as described above from the mixture of sulfur containing organic compounds. The inoculated culture medium is then used to contact the jet fuel under incubating conditions, the phases separated, and the jet fuel tested as described in Example I. Results of tests on the jet fuel before and after treatment are given in Table VI below.

*Table VI*

| Physical properties of jet fuel | Before | After treatment | After filtration |
| --- | --- | --- | --- |
| Gravity, API | 47.3 | 47.2 | |
| ASTM Distillation, ° F.: | | | |
| IBP | 142 | 143 | |
| 10% | 227 | 242 | |
| 50% | 346 | 348 | |
| 90% | 423 | 410 | |
| FBP | 457 | 448 | |
| Reid vapor pressure, lb | 2.5 | 2.6 | |
| Freezing point, ° F | below −80 | below −80 | |
| Sulfur, wt. percent | 0.25 | 0.01 | |
| Nitrogen, wt. percent | 0.001 | | |
| Bromine, No., g./100 g | 3.4 | 1.8 | |
| Existent gum, mg./100 ml | 0.2 | 5.0 | 1.0 |
| Accelerated gum, mg./100 ml | 0.8 | 6.0 | 1.0 |
| Hydrocarbon type analysis: | | | |
| Saturates, Vol. percent | 87.3 | 87.4 | |
| Olefins, Vol. percent | Trace | Trace | |
| Aromatics, Vol. percent | 12.7 | 12.6 | |

As will be understood by those skilled in the art, the invention is not limited to any specific incubating conditions. Any suitable incubating conditions can be used. For example, the incubation can be carried out at temperature within the range of 4 to 55° C., preferably within the more narrow range of 25 to 35° C. Likewise, agitation can be provided during the incubation or omitted as desired. Any suitable type of agitaiton can be used.

Any suitable source of organic nitrogen containing compounds, organic oxygen containing compounds, and/or organic sulfur containing compounds can be used as the source material for the nitrogen, oxygen and/or sulfur in propagating the microorganisms to be used in the practice of the invention. Thus, the invention is not limited to the use of crude oils containing said organic contaminants. Likewise, the invention is not limited to the use of the specific nitrogen containing compounds used in Example I, or to the specific sulfur containing compounds used in Example II. With respect to the nitrogen containing compounds, any suitable organic nitrogen containing compounds can be used. With respect to organic sulfur containing compounds, any suitable organic sulfur containing compounds can be used. Likewise, any suitable organic oxygen containing compounds can be used.

The invention is not limited to any specific concentration of the pure nitrogen, sulfur, or oxygen containing compounds in the kerosene culture mediums used in the above Examples I and II. As will be understood by those skilled in the art, the concentration of said nitrogen, sulfur, or oxygen containing compounds in the kerosene solutions used in the culture mediums employed in the practice of the invention should be selected with care because many of said compounds are toxic to microorganisms when used in strong concentrations. When used in culture mediums in the practice of the invention as described above, concentrations in the order of up to 0.075 weight percent can be used. The preferred concentrations in such culture mediums will usually range between 0.001 and 0.05 weight percent. The microorganisms will readily adapt to said preferred concentrations. However, any nutrient concentration of said compounds can be used.

While the invention has been described above as particularly applicable to jet fuels, and particularly jet fuel of the kerosene type, the invention is not limited thereto. The invention can be used to treat any of the known types of jet fuels, for example those commonly referred to as JP-3, JP-4 and JP-5, etc. For that matter, the invention is applicable to treating any liquid hydrocarbons or mixtures of liquid hydrocarbons. The invention is most applicable to those liquid hydrocarbons boiling within the range of about 100 to about 750° F. Thus, the invention can be used to treat gasolines, kerosenes, diesel fuels, jet fuels, naphthas, gas oils, etc. The invention is also applicable to the treatment of pure liquid hydrocarbons.

It is within the scope of the invention to treat the hydrocarbons with a strain or strains of microorganisms capable of consuming and requiring (*a*) one organic contaminant, or (*b*) a plurality of organic contaminants for assimilation in their metabolic processes. Thus, separate strains of microorganisms, each adapted to one organic contaminant, can be propagated and used to treat hydrocarbons, either separately or in combination. Also, one can propagate a first colony of microorganisms adapted to consume and require (for example) organic contaminants "A" for assimilation in their metabolic processes. Said first colony of microorganisms can then be used to propagate a second colony of microorganisms adapted to consume and requiring both of organic contaminants "A" and organic contaminants "B." Said second colony of microorganisms can then be used to propagate a third colony of microorganisms adapted to consume and requiring all three of organic contaminants "A," "B," and "C" in their metabolic processes. Either of said second or said third colony can be used to treat hydrocarbons as described, depending upon what contaminants are to be removed.

While certain examples have been set forth above for purposes of illustration, the invention is not limited thereto. Various other modifications of the invention will be apparent to those skilled in the art in view of this disclosure. Such modifications are within the spirit and scope of the invention.

I claim:

1. A method of treating liquid petroleum hydrocarbons for the removal of organic contaminants therefrom, which method comprises the steps of: propagating, from a sea water culture medium containing an added nutrient selected from the group consisting of ammonium nitrate and ammonium sulfate, colonies of microoganisms which consume and require said contaminants for assimilation in their metabolic processes; inoculating another sea water culture medium with said microorganisms; and contacting said hydrocarbons with said inoculated culture medium in the absence of any added nutrient.

2. A method for stabilizing liquid petroleum hydrocarbons for future storage over sea water by removing organic contaminants therefrom, which method comprises the steps of: propagating, from a sea water culture medium containing an added nutrient selected from the group consisting of ammonium nitrate and ammonium sulfate, colonies of microorganisms which consume and require said contaminants for assimilation in their metabolic processes; inoculating another sea water culture medium with said microorganisms; contacting said hydrocarbons under incubating conditions with said inoculated sea water medium in the absence of added nutrient for a period of time sufficient to permit growth of said microorganisms; and separating said hydrocarbons from said inoculated culture medium.

3. A method of treating a mixture of liquid petroleum hydrocarbons for the removal therefrom of at least one class of organic contaminant selected from the group of classes consisting of organic nitrogen containing compounds, organic sulfur containing compounds, and organic oxygen containing compounds, which method comprises the steps of: propagating, from a sea water culture medium containing an added nutrient selected from the group consisting of ammonium nitrate and ammonium sulfate, a colony of microoragnisms which consume and require at least one of said classes of organic contaminants for assimilation in their metabolic processes; inoculating another sea water culture medium with said microorganisms; contacting said mixture of liquid hydrocarbons with said inoculated sea water culture medium in the absence of added nutrient under incubating conditions with agitation and in the presence of air for a period of time sufficient to permit growth of said microorganisms and thus substantially reduce the concentration of at least one of said classes of contaminants in said hydrocarbons; and separating the thus treated hydrocarbons from said last mentioned culture medium.

4. A method according to claim 3 wherein said contaminant is an organic nitrogen containing compound.

5. A method according to claim 3 wherein said contaminant is an organic sulfur containing compound.

6. A method according to claim 3 wherein said contaminant is an organic oxygen containing compound.

7. A method of treating a mixture of liquid petroleum hydrocarbons for the removal therefrom of organic nitrogen containing compounds and organic sulfur containing compounds which are present in said mixture as contaminants, which method comprises the steps of: propagating, from a sea water culture medium containing ammonium nitrate as an added nutrient, a first colony of microorganisms which consume and require organic nitrogen containing compounds for assimilation in their metabolic processes; propagating, from a sea water culture medium containing ammonium sulfate as an added nutrient, a second colony of microorganisms which consume and require organic sulfur containing compounds for assimilation in their metabolic processes; inoculating another sea water culture medium with some of said first colony and some of said second colony of microorganisms; contacting said hydrocarbons under incubating conditions with said inoculated sea water culture medium in the absence of added nutrient for a period of time sufficient to permit growth of said microorganisms therein; and separating said hydrocarbons from said inoculated culture medium.

8. A method of treating a mixture of liquid petroleum hydrocarbons for the removal therefrom of organic nitrogen containing compounds and organic sulfur containing compounds which are present in said mixture as contaminants, which method comprises the steps of: propagating, from a sea water culture medium containing ammonium nitrate as an added nutrient, a first colony of microorganisms which consume and require organic nitrogen containing compounds for assimilation in their metabolic processes; inoculating a second sea water culture medium containing ammonium sulfate as an added nutrient with some of first colony of microorganisms and propagating therefrom a second colony of microorganisms which consume and require both organic nitrogen containing compounds and organic sulfur containing compounds for assimilation in their metabolic processes; inoculating a third sea water culture medium with some of said second colony of microorganisms; contacting said hydrocarbons under incubating conditions with said third sea water culture medium in the absence of added nutrient for a period of time sufficient to permit growth of said microorganisms therein; and separating said hydrocarbons from said last mentioned culture medium.

9. A method of treating a mixture of liquid hydrocarbons boiling within the range of about 100 to about 750° F. for the removal of organic nitrogen containing compounds present therein as contaminants, which method comprises the steps of: contacting a crude oil containing a relatively high percentage of organic nitrogen containing compounds with a nutrient medium comprising sea water having ammonium nitrate dissolved therein as an added nutrient; continuing said contacting under incubating conditions for a period of time sufficient to permit growth of microorganisms which consume and require organic nitrogen containing compounds for assimilation in their metabolic processes; preparing a plurality of kerosene solutions each containing a nutrient concentration of a pure organic nitrogen containing compound, each of said solutions containing a different compound; inoculating each of said kerosene solutions with said microorganisms from said crude oil culture; contacting each of said inoculated kerosenes under incubating conditions with separate portions of said sea water nutrient medium for a period of time sufficient to permit growth of microorganisms which consume and require organic nitrogen containing compounds of the type contained in said kerosene solutions for assimilation in their metabolic processes; preparing a mixture of equal volumes of said pure nitrogen containing compounds used to prepare said plurality of kerosene solutions; preparing a kerosene solution containing a nutrient concentration of said mixture; inoculating said solution of said mixture with microorganisms from each of said kerosene solution cultures; contacting said inoculated mixture under incubating conditions with another portion of said sea water nutrient medium for a period of time sufficient to permit growth of microorganisms which consume and require for assimilation in their metabolic processes organic nitrogen containing compounds of the type contained in said mixture, inoculating a sea water medium with said last mentioned microorganisms; contacting said mixture of liquid hydrocarbons with said inoculated sea water culture medium under incubating conditions in the absence of added nutrient for a period of time sufficient to permit growth of said last mentioned microorganisms and thus substantially reduce the concentration of said organic nitrogen containing contaminants; and separating the thus treated hydrocarbons from said inoculated culture medium.

10. A method of treating a mixture of liquid hydrocarbons boiling within the range of about 100 to about 750° F. for the removal of organic sulfur containing compounds present therein as contaminants, which method comprises the steps of: contacting a crude oil containing a relatively high percentage of organic sulfur containing compounds with a nutrient medium comprising sea water having ammonium sulfate dissolved therein as an added nutrient; continuing said contacting under incubating conditions for a period of time sufficient to permit growth of microorganisms which consume and require organic sulfur containing compounds for assimilation in their metabolic processes; preparing a plurality of kerosene solutions each containing a nutrient concentration of a pure organic sulfur containing compound, each of said solutions containing a different compound; inoculating each of said kerosene solutions with said microorganisms from said crude oil culture; contacting each of said inoculated kerosenes under incubating conditions with separate portions of said sea water nutrient medium for a period of time sufficient to permit growth of microorganisms adapted to consume and requiring for assimilation in their metabolic processes organic sulfur containing compounds of the type contained in said kerosene solutions; preparing a mixture of equal volumes of said pure sulfur containing compounds used to prepare said plurality of kerosene solutions; preparing a kerosene solution containing a nutrient concentration of said mixture; inoculating said solution of said mixture with microorganisms from each of said kerosene solution cultures; contacting said inoculated mixture under incubating conditions with another portion of said sea water nutrient medium for a period of time sufficient to permit growth of microorganisms which consume and require for assimilation in their metabolic processes organic sulfur containing compounds of the type contained in said mixture; inoculating a sea water culture medium with said last mentioned microorganisms; contacting said mixture of liquid hydrocarbons with said inoculated sea water culture medium under incubating conditions in the absence of added nutrient for a period of time sufficient to permit growth of said last mentioned microorganisms and thus substantially reduce the concentration of said organic sulfur containing contaminants; and separating the thus treated hydrocarbons from said inoculated culture medium.

11. A method of treating a mixture of liquid hydrocarbons boiling within the range of about 100 to about 750° F. for the removal of organic oxygen containing compounds present therein as contaminants, which method comprises the steps of: contacting a crude oil containing a relatively high percentage of organic oxygen containing compounds with a nutrient medium comprising sea water having ammonium nitrate dissolved therein as an added nutrient; continuing said contacting under incubating conditions for a period of time sufficient to permit growth of microorganisms adapted to consume and requiring organic oxygen containing compounds for assimilation in their metabolic processes; preparing a plurality of kerosene solutions each containing a nutrient concentration of a pure organic oxygen containing compounds, each of said solutions containing a different compound; inoculating each of said kerosene solutions with said microorganisms from said crude oil culture; contacting each of said inoculated kerosenes under incubating conditions with separate portions of said sea water nutrient medium for a period of time sufficient to permit growth of microorganisms adapted to consume and requiring for assimilation in their metabolic processes organic oxygen containing compounds of the type contained in said kerosene solutions; preparing a mixture of equal volumes of said pure oxygen containing compounds used to prepare said plurality of kerosene solutions; preparing a kerosene solution containing a nutrient concentration of said mixture; inoculating said solution of said mixture with microorganisms from each of said kerosene solution cultures; contacting said inoculated mixture under incubating conditions with another portion of said sea water nutrient medium for a period of time sufficient to permit growth of microorganisms which consume and require for assimilation in their metabolic processes organic oxygen containing compounds of the type contained in said mixture; inoculating a sea water culture medium with said last mentioned microorganisms; contacting said mixture of liquid hydrocarbons with said inoculated sea water culture medium under incubating conditions in the absence of added nutrient for a period of time sufficient to permit growth of said last mentioned microorganisms and thus substantially reduce the concentration of said organic oxygen containing contaminants; and separating the thus treated hydrocarbons from said inoculated culture medium.

12. A method of treating a liquid petroleum hydrocarbon for the removal of an organic contaminant therefrom, which method comprises the steps of: propagating, from a sea water culture medium containing an added nutrient selected from the group consisting of ammonium nitrate and ammonium sulfate, a colony of microorganisms which consume and require said contaminant for assimilation in their metalobic processes, said microorganisms being selected from the group consisting of species of Bacillus, Achromobacter, Pseudomonas, Thiobacteria, and mixtures thereof; inoculating another sea water culture medium with said microorganisms; and contacting said hydrocarbon with said inoculated culture medium in the absence of any added nutrient.

13. A method of treating a liquid petroleum hydrocarbon for the removal therefrom of at least one class of organic contaminant selected from the group of classes consisting of organic nitrogen containing compounds, organic sulfur containing compounds, and organic oxygen containing compounds, which method comprises the steps of: propagating, from a sea water culture medium containing as an added nutrient a compound containing at least one of the elements oxygen, nitrogen, and sulfur which is also contained in said contaminant, a colony of microorganisms which consume and require at least one of said classes of organic contaminants for assimilation in their metabolic processes; inoculating another sea water culture medium with said microorganisms; contacting said hydrocarbon with said inoculated sea water culture medium in the absence of any added nutrient under incubating conditions for a period of time sufficient to permit growth of said microorganisms and thus substantially reduce the concentration of at least one of said classes of contaminants in said hydrocarbon; and separating the thus treated hydrocarbon from said last mentioned culture medium.

14. A method of treating a liquid petroleum hydrocarbon for the removal therefrom of at least one class of organic contaminant selected from the group of classes consisting of organic nitrogen containing compounds, organic sulfur containing compounds, and organic oxygen containing compounds, which method comprises the steps of: propagating, from a sea water culture medium containing as an added nutrient a compound containing at least one of the elements oxygen, nitrogen, and sulfur which is also contained in said contaminant, a colony of microorganisms which consume and require at least one of said classes of organic contaminants for assimilation in their metabolic processes, said microorganisms being selected from the group consisting of species of Bacillus, Achromobacter, Pseudomonas, Thiobacteria, and mixtures thereof; inoculating another sea water culture medium with said microorganisms; contacting said hydrocarbon with said inoculated sea water culture medium in the absence of any added nutrient under incubating conditions for a period of time sufficient to permit growth of said microorganisms and thus substantially reduce the concentration of at least one of said classes of contaminants in said hydrocarbon; and separating the thus treated hydrocarbon from said last mentioned culture medium.

References Cited in the file of this patent

UNITED STATES PATENTS 2,521,761     Strawinski _____ Sept. 12, 1950

OTHER REFERENCES

Bushnell, L. D., and Haas, H. F.: "The Utilization of Certain Hydrocarbons by Microorganisms," J. Bact., 1941, vol. 41, pp. 653–673.

Davis, J. B. and Updegraff, D. M.: "Microbiology in the Petroleum Industry," 1954, Bact. Rev., vol. 18, No. 4, pp. 215–238.